US011331526B2

(12) United States Patent
Poggi (10) Patent No.: US 11,331,526 B2
(45) Date of Patent: *May 17, 2022

(54) METHOD AND STATIONARY OR MOVABLE DEVICE FOR NEUTRALIZING AND RECYCLING ASBESTOS WASTE

(71) Applicant: Paul Poggi, Clarens (CH)

(72) Inventor: Paul Poggi, Clarens (CH)

(*) Notice: Subject to any disclaimer, the term of this patent is extended or adjusted under 35 U.S.C. 154(b) by 1092 days.

This patent is subject to a terminal disclaimer.

(21) Appl. No.: 15/761,092

(22) PCT Filed: Sep. 21, 2016

(86) PCT No.: PCT/FR2016/052390
§ 371 (c)(1),
(2) Date: Mar. 17, 2018

(87) PCT Pub. No.: WO2017/051117
PCT Pub. Date: Mar. 30, 2017

(65) Prior Publication Data
US 2018/0256930 A1    Sep. 13, 2018

(30) Foreign Application Priority Data

Sep. 22, 2015  (WO) .................. PCT/FR2015/052542
Mar. 21, 2016  (FR) ........................................ 1652383

(51) Int. Cl.
*B09B 3/00*        (2022.01)
*A62D 3/36*        (2007.01)
(Continued)

(52) U.S. Cl.
CPC ................ *A62D 3/30* (2013.01); *A62D 3/36* (2013.01); *B09B 3/0066* (2013.01);
(Continued)

(58) Field of Classification Search
None
See application file for complete search history.

(56) References Cited

U.S. PATENT DOCUMENTS 5,258,562 A    11/1993  Mirick et al.
5,264,655 A *  11/1993  Mirick .................... A62D 3/35
                                                    252/79.3
(Continued)

FOREIGN PATENT DOCUMENTS

CA    2235424 A1    11/1999
EP    0546984 A1     6/1993
(Continued)

OTHER PUBLICATIONS

Wikipedia, "Reflux". Retrieved on Sep. 9, 2021. (Year: 2021).*
(Continued)

*Primary Examiner* — Jennifer A Leung
(74) *Attorney, Agent, or Firm* — Patshegen IP LLC; Moshe Pinchas (57) ABSTRACT

An asbestos waste neutralization device, that includes an acid tank and a vat containing a diluted acid solution, in which waste containing asbestos is dipped, the diluted acid solution neutralizing the waste containing asbestos during a neutralization reaction. The device further includes a filtration unit to separate, at the end of the neutralization reaction, solid inert waste from a liquid phase of the acid solution, and a regeneration unit for the liquid phase of the acid solution, which adjusts the hydrogen potential of the liquid phase of the acid solution by adding concentrated acid contained in the acid tank. In addition, the device includes an attenuation sensor for regenerated liquid phase of the acid solution from the regeneration unit, and a selective precipitation unit for the regenerated liquid phase of the acid solution, depending on the degree of attenuation the attenuation sensor senses.

17 Claims, 7 Drawing Sheets

(51) Int. Cl.
*C22B 3/02* (2006.01)
*C22B 3/06* (2006.01)
*A62D 3/30* (2007.01)
*C01B 33/12* (2006.01)
*C01B 33/20* (2006.01)
*C01F 11/46* (2006.01)
*C04B 14/40* (2006.01)
*C04B 18/04* (2006.01)
*C22B 1/00* (2006.01)
*C22B 7/00* (2006.01)
*A62D 101/41* (2007.01)
*C01B 39/00* (2006.01)
*B01J 19/00* (2006.01)

(52) U.S. Cl.
CPC ............ *C01B 33/126* (2013.01); *C01B 33/20* (2013.01); *C01F 11/46* (2013.01); *C04B 14/40* (2013.01); *C04B 14/405* (2013.01); *C04B 18/04* (2013.01); *C04B 18/0463* (2013.01); *C22B 1/005* (2013.01); *C22B 3/06* (2013.01); *C22B 7/007* (2013.01); *A62D 2101/41* (2013.01); *A62D 2203/10* (2013.01); *B01J 19/0086* (2013.01); *B01J 2219/00177* (2013.01); *C01B 39/00* (2013.01); *Y02P 10/20* (2015.11)

(56) References Cited

U.S. PATENT DOCUMENTS 10,286,243 B2 * 5/2019 Poggi ....................... A62D 3/36
2019/0217140 A1 * 7/2019 Poggi ................... C04B 14/405

FOREIGN PATENT DOCUMENTS

| | | |
|---|---|---|
| FR | 2790980 A1 | 9/2000 |
| FR | 2930893 A1 | 11/2009 |
| JP | 2004075531 A * | 3/2004 |
| JP | 2008253856 A | 10/2008 |
| JP | 2009018228 A | 1/2009 |
| WO | 88/10234 A1 | 12/1988 |
| WO | 95/12463 A1 | 5/1995 |
| WO | 2008/093368 A1 | 8/2008 |
| WO | 2009/141566 A2 | 11/2009 |

OTHER PUBLICATIONS

Wikipedia, "Mesh (scale)". Retrieved on Sep. 9, 2021. (Year: 2021).*
ISR; European Patent Office; NL; dated Feb. 23, 2017.
ISR; European Patent Office; NL; dated Jan. 22, 2016.

* cited by examiner

Figure 10

METHOD AND STATIONARY OR MOVABLE DEVICE FOR NEUTRALIZING AND RECYCLING ASBESTOS WASTE

TECHNICAL FIELD OF THE INVENTION

The present invention envisages a method and a device, fixed or mobile, for neutralizing and reusing asbestos waste. This invention applies, in particular, to neutralizing, recycling and reusing asbestos waste.

More specifically, it applies to asbestos waste regardless of its origin, especially waste from asbestos removal worksites in civil engineering (abbreviated to BTP in French) and ship breaking.

STATE OF THE ART

Asbestos is not a mineral per se. It is a generic term that designates a group of naturally metamorphic rocks, of fibrous morphology. The term "asbestos" has been adopted for purposes of commercial identification.

Asbestos can be divided into two major mineral families:
serpentines, of which there is one single variety—chrysotile—and
amphiboles, which break down into five varieties, amosite, crocidolite, actinolite, anthophyllite and tremolite.

Three types were widely sold:
chrysotile (white asbestos), chemical formula $Mg_3Si_2O_5(OH)_4$,
crocidolite (blue asbestos), chemical formula $Na_2(Mg,Fe)_3Al_2Si_8O_{22}(OH)_2$, and
amosite (brown asbestos), chemical formula $(Mg,Fe)_7Si_8O_{22}(OH)_2$ The chrysotile variety accounts for over ninety-five percent of the asbestos produced and consumed between 1900 and 2003.

Asbestos is a material which possesses several advantages:
interesting physico-chemical properties such as thermal, mechanical and chemical resistance,
a low selling price due to low production costs.

This is why asbestos is used in more than three thousand products, notably in the domain of construction materials. It is particularly to be found in:
flocking,
false ceilings,
floor coverings,
insulation lagging, cladding,
packaging,
seals,
wall and ceiling coverings,
roofs and facades, and
ventilation and water ducts.

There are three major types of waste containing asbestos:
loose asbestos waste, originating from flocking and cladding or lagging, operators' materials and equipment (bags, tools and accessories, etc) whose fibers can easily be released into the atmosphere,
asbestos waste linked to inert material (asbestos-cement), which is not susceptible to disintegration and release of fibers,
asbestos waste linked to non-inert material (slabs, vinyl, etc).

On disintegration, asbestos releases microscopic fibers which remain in suspension in the air and which, when inhaled, can be absorbed into the lung alveoli.

Research carried out on asbestos has demonstrated that the risks associated with its use exist predominantly when the asbestos takes the form of inhalable particles, notably in the guise of loose acicular fibers, the inhalation of which is likely to result in fibrous or cancerous formations, notably in the human body, giving rise to the appearance of illnesses such as lung cancer or asbestosis. Pathologies of this type have been attributed to the acicular form of asbestos fibers but equally to the effect of liberated ions on living tissues following partial dissolution of asbestos.

This can lead to the appearance of several illnesses:
asbestosis, a pulmonary infection analogous to the silicosis of miners, benign lesions of the pleurae,
lung cancer (increased risk where association with tobacco) and
mesotheliomas, rare but grave cancers of the pleurae and peritoneum.

On account of these risks, waste containing asbestos is considered dangerous industrial waste, and research has been conducted in recent years to develop techniques for its confinement or its efficient elimination. On this subject, one finds in France much loose and bonded asbestos waste, mainly flocking, lagging material and asbestos cement, coming from building and public works sites. The use of asbestos was widespread until the manufacture and use of products containing asbestos fibers were banned in 1997.

A diagnosis of the presence of asbestos is imposed by law for all works subject to an authorization for demolition or for the transformation of buildings constructed before Jan. 1, 1991. Construction materials containing asbestos must be removed and eliminated according to the appropriate regulations.

Two procedures for the elimination of asbestos waste are recognized as of the present: landfill and vitrification.

The first solution adopted for the management of waste containing asbestos consists of storing the asbestos waste mainly in Hazardous Waste Management Facilities (AKA Treatment, Storage and Disposal Facilities, or TSDF). This mode of confinement is hardly satisfactory as a solution, especially insofar as there is no treatment able to make the waste harmless, and that it leads to an accumulation of dangerous waste on sensitive sites. In France, there are thirteen Hazardous Waste Management Facilities. Since their storage capacity is limited, these facilities are all nearing saturation point, as well as incurring significant costs. Further, the producer of the waste remains liable in terms of responsibility for as long as the asbestos exists, so forever.

The cost of storing in TSDFs is relatively high and variable, about six hundred and fifty to twelve hundred Euros per metric ton, excluding transporting the waste and the general tax on polluting activities.

Another solution currently utilized consists in the vitrification of the waste containing asbestos, achieved by heating the waste to a very high temperature, typically with a plasma torch. Such a technique proves to be efficient, as it leads to a conversion of all types of asbestos into a vitrified material that is not likely to release inhalable fibers from acicular asbestos. There is nevertheless a major drawback to this treatment method, which is the very high cost due to a very substantial energy consumption related to the deployment of the plasma torch and the installation and maintenance costs for the highly technological apparatus required. The implementation cost of the vitrification method is of the order of one thousand three hundred and fifty to three thousand Euros per metric ton, excluding transports and taxes.

In addition, only one facility of this type exists in Europe, with a relatively small treatment capacity of 22 metric tons per day (ie 8,000 metric tons per year), which represents a very small quantity, compared to the very high quantities of asbestos waste currently needing to be processed. For information, in France, the annual quantity of waste containing asbestos is of the order of five hundred thousand metric tons of loose flocked asbestos and twenty-two million metric tons of asbestos cement. Currently in France, there are approximately 100 million $m^2$ of buildings which still contain asbestos. Solutions other than landfill and vitrification have been envisaged for the treatment of asbestos waste, but they proved to be either not applicable in industry or less efficient than vitrification.

There was also for example a proposal to mechanically destroy the acicular structure of the asbestos fibers by subjecting them to an intensive grinding designed to induce an amorphization of the asbestos structure.

Furthermore, it was proposed to perform an acid attack on the asbestos waste with the objective of making the acicular fibers soluble. Within this framework, a radical method consists of attacking the asbestos with concentrated hydrofluoric acid. This attack certainly proved to be very effective but could only be envisaged in a laboratory environment as the toxicity and risks related to the use of hydrofluoric acid would proscribe its implementation on an industrial scale. In addition, it provided no remarkable solution for recycling the waste.

The use of acids other than the above mentioned hydrofluoric acid has been proposed but an attack by these alternative acids proved to be largely ineffective in the treatment of most types of asbestos waste. For example, the document WO 97/27902 describes a treatment for dissolving asbestos with hydrochloric acid with added potassium ions and possibly other acids, at temperatures of the order of thirty to ninety-five degrees Celsius. The procedure described in this document could certainly prove to be effective with certain types of asbestos, notably the chrysotile type of asbestos, but in a majority of cases proved to be unsuited to the treatment of the amphibole type of asbestos, in particular the cummingtonites (especially the amosites) and the crocidolites, and particularly in respect of flocked asbestos. Numerous publications have established in fact that the effect of acid attacks on asbestos remains as a general rule limited to the surface of the acicular fibers of the asbestos, in particular where the amphibole type of asbestos is concerned. This appears to be explained by the compactness of the dense structure and the formation of a surface gel that prevents the attack from reaching the core of the asbestos fibers. For further details on this subject, please refer to the article "Dissolution of fibrous silicates in acid and buffered salt solutions", Allen M P. and Smith R. W., Minerals Engineering, vol. 7, 1527-1537 (1994).

Other solutions envisage a procedure for treatment of waste containing asbestos, by making the waste react with an acid other than hydrofluoric acid at a temperature of at least one hundred and twenty-five degrees Celsius and at a pressure above 0.2 MPa (ie at a pressure of at least two bar), and wherein:

the asbestos contained in the treated waste is of the amphibole type;

the solution obtained as a result of leaching the asbestos with acid is reused.

SUBJECT OF THE INVENTION

The present invention aims to remedy all or part of these drawbacks.

To this end, according to a first aspect, the present invention envisages a device for neutralizing asbestos waste, which comprises:

an acid tank, a vat containing a diluted acid solution, in which waste containing asbestos is dipped, with this solution neutralizing the asbestos waste, a filtration unit to separate, at the end of the neutralization reaction, the solid inert waste from the liquid phase of the acid solution, a regeneration unit for the attacking acid solution, which adjusts the hydrogen potential of the extracted liquid phase by adding concentrated acid contained in the acid reservoir, and means for transferring the regenerated solution into the vat.

Thanks to these provisions, the neutralization performance of the acid contained in the vat is maintained for each of the successive waste neutralization cycles in this vat. In addition, keeping the vat containing the acid solution at a preset temperature is simplified and requires a heat input corresponding to the additional heating of the regenerated acid solution to reach the working temperature. Lastly, the inert solids from the neutralized waste are recovered and recycled for use in manufacturing.

In some embodiments, the device that is the subject of the present invention comprises means for determining a type and/or content of asbestos in the waste prior to immersion in the vat, with the regeneration unit adjusting the hydrogen potential of the regenerated acid solution as a function of the type and/or content of asbestos.

These embodiments make it possible to adjust the quantity of acid required to be added to the acid solution to be regenerated.

In some embodiments, the device that is the subject of the present invention comprises means for the treatment of neutralized waste transformed into inert solids as a function of the asbestos content determined.

The advantage of these embodiments is that they use the properties of the neutralized waste in optimum fashion, depending on the type and content of asbestos in the waste, to create new raw materials, which can be used in manufacturing, eg cement additives.

In some embodiments, the device that is the subject of the present invention comprises a unit for grinding asbestos waste before immersion in the acid vat, which reduces the size of the waste to dimensions ranging from one-tenth of a millimeter to one millimeter.

These embodiments make it possible to speed up the neutralization of the asbestos waste and therefore to optimize the device that is this subject of the present invention.

In some embodiments, the device that is the subject of the present invention comprises an attenuation sensor for the asbestos waste neutralization acid solution, and a selective precipitation unit for the acid solution's liquid phase, depending on the degree of attenuation it senses, powered by the regeneration unit.

Thanks to these provisions, once the regenerated acid neutralization solution has reached its performance threshold, this solution is processed and brought to neutral pH, then the principal elements it contains are extracted for recycling. Consequently, the risks of corrosion and of danger to the operator are removed.

In some embodiments, the attenuation sensor is a probe in the form of an ion-selective electrode (ionic activity sensor).

These embodiments have the advantage of being able to monitor the progress of the reaction in the vat in real time.

In some embodiments, the filtration unit comprises a filter with a pore size lower than 0.5 μm.

In some embodiments, the device that is the subject of the present invention comprises an exterior closed loop connected to the vat and having means for cooling the vapors on exit from the vat.

These embodiments make it possible to liquefy the vapors released in the vat in order to reduce the discharge of gas effluent. The volume of acid is preserved.

In some embodiments, the device that is the subject of the present invention comprises means for humidifying the waste before it is immersed in the vat of diluted acid.

Such provisions make it possible to prevent the asbestos fibers from becoming volatile.

In some embodiments, the device that is the subject of the present invention comprises means for desalinating water before diluting the acid in the vat with the desalinated water.

These embodiments make it possible, in the case of mobile devices, to avoid having a limited stock of desalinated water.

In some embodiments, the device that is the subject of the present invention comprises a washing and drying unit for the neutralized wasted transformed into inert solids.

Thanks to these provisions, the inert solids no longer contain any traces of acid and are therefore no danger to a user.

In some embodiments, the device that is the subject of the present invention comprises means for recovering the washing water for the preparation of the acid solution.

These embodiments make it possible to save the water used in the device and to reuse the water used for washing.

In some embodiments, the vat comprises at least one agitation system.

The advantage of these embodiments is that they homogenize the reactive mixture in the vat.

In some embodiments, the device that is the subject of the present invention comprises means for heating the acid solution by microwaves.

These embodiments make it possible to heat the acid solution quickly and at a low cost.

In some embodiments, the device that is the subject of the present invention comprises a confined asbestos waste sorting unit comprising:
  a window equipped with glove boxes, and
  a conveyor to transport the asbestos waste behind the window.

These embodiments make it possible to sort the asbestos waste without requiring personal protection equipment for the operators. These embodiments allow savings to be made on the budget allocated for personnel protection.

According to a second aspect, the present invention envisages a method for neutralizing the asbestos waste, comprising the following steps:
  dilution of acid and filling of a vat with a diluted acid solution that neutralizes the asbestos waste,
  immersion of waste containing asbestos,
  neutralization of the asbestos waste in the vat,
  filtration to separate the liquid phase after the asbestos waste has been neutralized,
  regeneration of the acid solution, which adjusts the hydrogen potential of the extracted liquid phase by adding acid contained in the acid reservoir, and
  transferring the regenerated acid solution into the vat.

As the particular features, advantages and aims of the method that is the subject of the present invention are similar to those of the device that is the subject of the present invention, they are not repeated here.

In some embodiments, the method that is the subject of the present invention comprises a step of measuring the attenuation of the acid solution, wherein the acid solution is regenerated as long as the measured attenuation is below a predefined limit value and, when the measured attenuation is above the predefined limit value, a step of extracting the by-products of the liquid phase by selective precipitation of the acid solution.

BRIEF DESCRIPTION OF THE FIGURES

Other advantages, aims and particular features of the invention will become apparent from the non-limiting description that follows of at least one particular embodiment of the device and method that are the subjects of the present invention, with reference to drawings included in an appendix, wherein.

DESCRIPTION OF EXAMPLES OF REALIZATION OF THE INVENTION

The present description is given in a non-limiting way, each characteristic of an embodiment being able to be combined with any other characteristic of any other embodiment in an advantageous way. In addition, each parameter of an example of realization can be utilized independently from the other parameters of said example of realization.

It is now noted that the figures are not to scale.

Figure 1:
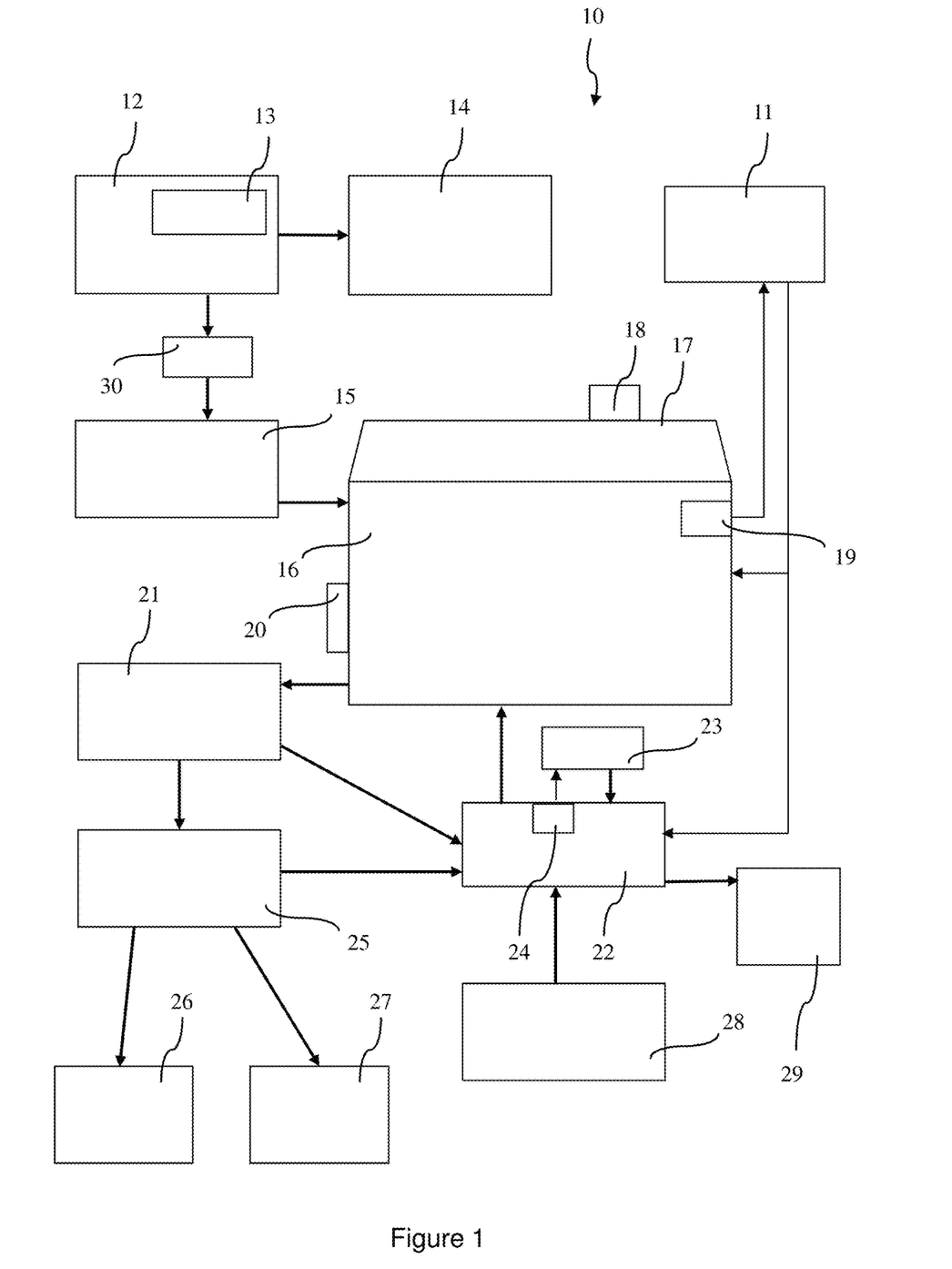
FIG. 1 represents, schematically, a particular embodiment of a device that is the subject of the present invention.

FIG. 1, which is not to scale, shows a schematic view of an embodiment of the asbestos waste neutralization device 10 that is the subject of the present invention. In FIG. 1, the thicker arrows represent matter flows and the thinner arrows represent data flows.

The device 10 comprises an acid tank 23. Preferably, the acid contained in the tank is sulfuric acid, chemical formula $H_2SO_4$.

The device 10 comprises a vat or reactor 16 containing a diluted acid solution, into which the waste containing asbestos is dipped, neutralizing the asbestos. Preferably, the diluted acid solution is a solution of sulfuric acid diluted with water.

The vat 16 comprises means 20 for heating the acid solution. Preferably, the means 20 for heating the acid solution are heating means using electrical for microwave energy. In some embodiments, the heating means are positioned on acid and water supply conduits of the vat 16. In some embodiments, the heating means 20 comprise heating by electrical energy, by microwave or by a furnace with coils for circulating the heat-transfer liquid surrounding the vat 16.

The acid solution in the vat 16 is heated to a temperature close to the boiling temperature of the acid solution. Preferably, the temperature of the acid solution in the vat 16 is below 104° C. In some embodiments, the temperature of the acid solution in the vat 16 is between 80° C. and 100° C.

The vat 16 has adiabatic walls, thus slowing down heat loss. There are cooling means 17 above the vat 16. Since the temperature of the acid solution contained in the vat is close to its boiling temperature, the cooling means 17 make it possible to condense the evaporated acid. Once liquefied, the acid vapors return into the vat 16. In this way, one achieves a conservation of the acid solution's mass and a limitation of the discharge of noxious fumes.

Preferably, the cooling means 17 comprise a cooling column fitted with metal coils traversed by a cold heat exchange fluid, eg water. The cooling means 17 end in a flue 18 designed to keep the pressure of the atmosphere inside the vat 16 equal to the atmospheric pressure. The flue 18 is fitted with a filter, eg a charcoal filter, to capture any gaseous discharge.

Preferably, the vat 16 comprises at least one agitation system. The agitation system may be a device comprising a rod fitted with mobile blades centered in the fixed vat 16, for example. Or a device comprising a rod fitted with fixed blades centered in the mobile vat 16.

The device 10 comprises a filtration unit 21 to separate, firstly, the liquid phase of the acid solution after the neutralization of the asbestos waste, and, secondly, the solid neutralized waste, ie the inert solids resulting from the neutralization.

The filtration unit 21 is connected to the acid vat 16. Once the neutralization reaction has finished in the vat 16, the acid solution is transferred to the filtration unit 21, for example by means of a valve at the bottom of the vat or an aspiration pump (not shown). Preferably, the filtration unit 21 comprises a filter with a pore size between 0.4 and 0.5 μm, preferably 0.45 μm. This filter has a membrane (sieve) resistant to acid, especially sulfuric acid, for example a polypropylene (PP) or polytetrafluoroethylene (PTFE, aka Teflon) membrane.

The device 10 comprises a regeneration unit 22 for the acid solution, which adjusts the hydrogen potential of the extracted liquid phase by adding concentrated acid contained in the acid reservoir 23.

Preferably, the regeneration unit 22 comprises a pH meter 24. The pH meter 24 measures the hydrogen potential of the acid solution during the regeneration in the regeneration unit and triggers or stops adding acid. For example, the tank 23 may comprise a valve comprising activation means based on the value detected by the pH meter 24. The valve can be activated as long as the value measured by the pH meter 24 is above a predefined limit value. The predefined limit value is preferably between zero and one.

The asbestos content in the sorted waste is determined by Transmission Electron Microscopy (TEM) in a laboratory. In this way, one estimates the proportions of the chemical elements making up the type of asbestos present in the waste to be processed. The regeneration unit 22 adjusts the regenerated acid solution's hydrogen concentration and potential according to the asbestos content determined in this way. Consequently, depending on the determined asbestos content, the quantity of concentrated acid for regenerating the acid solution can be changed.

Of course, a safety factor is taken into consideration to ensure that all the asbestos is neutralized.

The device 10 comprises means for transferring the regenerated acid solution into the vat 16. The means for transferring the regenerated acid solution comprise a suction pump, for example.

The neutralized waste, once filtered in the filtration means 21, are washed and dried in a unit 25 for washing and drying the inert solids. The device comprises the washing and drying unit 25. In the washing and drying unit 25, water is projected onto the neutralized waste transformed into inert solids to remove the remaining acid. The inert solids are then dried in order to be treated.

The device 10 comprises means 26 or 27 for treating the neutralized waste transformed into inert solids. In some embodiments, the asbestos content determined before immersion of the waste in the acid and the composition of the waste direct the resulting inert solids towards different treatment means 26 or 27. For example, if the asbestos content is below forty percent for asbestos-cement type waste, the waste is neutralized to be transformed into a calcic solid called anhydrite, which can be used as an additive in cement manufacturing. According to another example, if the asbestos content is above seventy percent for lagging or flocking type waste, the inert solid obtained is a silicic solid (high silica content) which can be recycled into zeolites. In some embodiments, the treatment means 26 are means for collecting the calcic residue containing anhydrite. And the treatment means 27 are means for carrying out zeolite synthesis.

In some embodiments, the device 10 comprises a hermetic unit 12 for sorting the waste, comprising:
   a window equipped with glove boxes, and
   a conveyor to transport the asbestos waste behind the window.

The hermetic sorting unit 12 operates under negative pressure to prevent the release of asbestos fibers into the outside environment.

The hermetic sorting unit 12 comes before the vat 16. The sorting of the asbestos waste is therefore carried out before the immersion of the waste into the vat 16. On output from the sorting unit, waste that cannot be processed in the vat 16 is treated in another vat 14 with different dimensions. The asbestos waste intended for treatment in the vat 14 is neutralized but is not sent to the treatment means 26 and 27. The other waste is sent to the vat 16.

In this way, the asbestos waste is neutralized but not recycled. The waste directed towards the vat 14 is, for example, waste wood or personal protection equipment (contaminated masks, mask filters, gloves, overalls and clothing). In this way the recycling process is not contaminated with undesirable elements.

In some preferred embodiments, the device 10 comprises, means 13 for humidifying the asbestos waste before immersion in the vat 16 of diluted acid. The humidifying means 13 are sprinklers which impregnate the waste in the hermetic unit 12 with water. The humidification makes it possible to prevent dangerous dust, especially asbestos fibers, from remaining in suspension in the air. This washing water is recovered and preferably used to dilute the acid, which avoids discarding water polluted with the asbestos fibers, and ensures the neutralization of the asbestos contained in the recovered dust, thus providing a hygienic and secure process.

In some embodiments, the device 10 comprises a station 15 for grinding asbestos waste before immersion in the vat 16 of acid, which reduces the size of the waste containing asbestos to dimensions ranging from one-tenth of a millimeter to one millimeter. The grinding station 15 is located between the hermetic sorting unit 12 and the acid vat 16. The grinding station 15 comprises at least one grinder, at least one screen and/or at least one crusher. In some embodiments, the grinding station 15 comprises a shredding device not shown in FIG. 1.

In the embodiment illustrated in FIG. 1, a weighing station 30 comes before the grinding station 15, which is followed by a suction pump, transferring the ground waste towards the vat 16.

In some variants (not shown), there are automatic means for determining the asbestos content between the grinding station 15 and the vat 16, which determine the asbestos content in the ground waste.

In some preferred embodiments, the device 10 comprises an attenuation sensor 19 for the acid solution coming from the asbestos waste neutralization, and a selective precipitation unit 29 for the acid solution's liquid phase, depending on the degree of attenuation it senses, fed by the regeneration unit 22. Preferably, the acid solution is regenerated until the measured attenuation is above a predefined limit value. If the measured attenuation is greater than a predefined limit value, the acid solution is transferred to the selective precipitation unit, which causes the magnesium to precipitate as a salt or oxide, after being separated from the other, unwanted, metal ions by bringing the pH of the used acid solution to values preferably in a range of 6.5 to 9. The magnesium from the reaction in the vat is present in the precipitate and can be recovered as magnesium sulfate. Preferably the attenuation sensor is a pH or ionic activity sensor (preferably an ion-selective electrode). Preferably, the attenuation depends on the concentration of magnesium in the acid solution.

Figure 2:
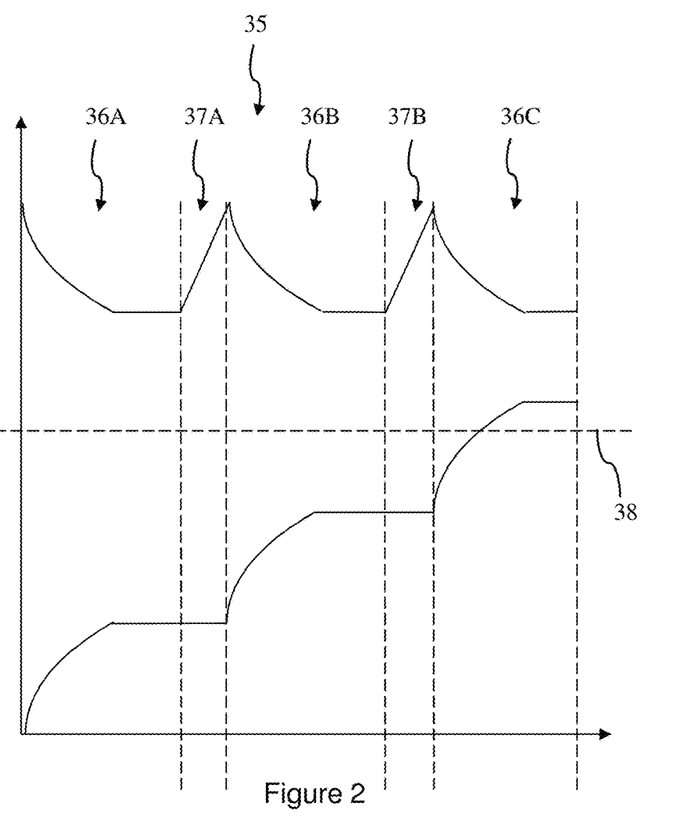
FIG. 2 represents, schematically, a cycle of an acid solution of a device that is the subject of the present invention.

The cycle 35 of the initial acid solution is shown in FIG. 2. The x-axis represents time and the y-axis represents the percentage of magnesium ions and the percentage of $H^+$ ions in the acid solution. The percentage scales are not the same, since the percentage of $H^+$ ions is higher than the percentage of magnesium ions.

At the start of a first phase 36A, the acid solution is introduced and heated in the vat 16, and the waste containing ground asbestos is introduced into the vat 16. During the first reaction, phase 36A, the percentage of magnesium ions in solution increases, whereas the percentage of $H^+$ ions decreases. After a period of time, the asbestos is neutralized, and these percentages no longer change. During the regeneration of the acid solution, phase 37A, the initial content of $H^+$ ions is restored and the concentration of magnesium ions in solution decreases slightly, because of the dilution caused by adding acid.

Phases 36B and 37B correspond to phases 36A and 37A, except that the acid solution is initially doped with magnesium ions.

Phase 36C corresponds to phase 36B, except that the acid solution regenerated to start phase 36C is initially doubly doped with magnesium ions.

A probe in the form of an ion-selective electrode dipped into the acid solution estimates the content of magnesium ions in the solution (by ionic activity).

If, at the end of a neutralization phase, the magnesium ion content exceeds a predefined limit value 38, the acid solution is no longer regenerated but one recovers the magnesium ions by precipitating them in the form of a salt or oxide after steps of separation from the other unwanted metal ions by selective precipitation. In this way, all the magnesium is recycled for reuse.

Alternatively, one measures the consumption of the $H^+$ ions by means of a pH meter, or the consumption of acid required for the regeneration of the acid solution, as this consumption is representative of the quantity of magnesium coming from the neutralization of the asbestos. When the total consumption of acid during the successive regenerations of the acid solution reaches a predefined limit value, one stops the cycle and makes the magnesium ions precipitate. In FIG. 2, it is assumed that, from phase 36C, the predefined limit value has been reached.

For example, the predefined limit value corresponds to an interval of 12 to 14 grams of magnesium per liter of acid solution.

Returning to FIG. 1, in some embodiments, the device 10 comprises means for recovering the washing water to use it for diluting the acid in the vat 16. The recovered water is supplied to the regeneration unit 22.

In some embodiments, especially for a shipborne unit, the device 10 comprises means 28 for desalinating sea water to supply water used to sprinkle on the asbestos waste in the sorting unit, to produce the diluted acid aqueous solution, or to wash the inert solids after neutralization. The desalination means 28 preferably also supplies water to the regeneration means 22 and the waste sorting unit 12.

Preferably, the device 10 comprises a control unit 11 that controls the values of the various operating parameter of the device 10, such as:

the agitator's rotational speed,
starting and stopping the grinding station 15 depending on the mass of the waste that has already entered into the reaction vat 16,
inserting waste into the vat 16,
starting and stopping the heating means 20 and the means for humidifying 13, washing and drying 25 and desalinating water 28,
the quantity of water or acid to be added to the acid solution for the regeneration of the acid solution as a function of the hydrogen potential sensed by the pH meter 24, and
triggering the precipitation of the acid solution as a function of the measured attenuation of the acid solution.

The control unit 11 takes into account the data from the various sensors, such as the hydrogen potential from the pH meter 24, the attenuation of the acid solution measured by the attenuation sensor 19, the temperature of the acid solution, the mass of waste introduced, the mass of waste filtered, for example.

The control unit 11 also provides traceability of the asbestos elements admitted into the treatment unit.

The control unit 11 makes it possible to create a reference database where the waste treated in the neutralization units is cataloged, for example according to:

the typology of the waste
the nature of the waste
the source of the waste (worksite)
the composition
the king of asbestos contained in this waste
etc.

The treatment unit uses an approach for neutralizing asbestos waste (irrespective of its typology) in short timescales (always under 24 hours) by immersing it in an acid solution at temperatures below the boiling temperature of the acid solution, eg 104° C., preferably below 100° C., preferably above 70° C. and even more preferably above 80° C.

Preferably, the acid used is sulfuric acid, which has shown the best neutralization results on asbestos waste.

The most used variety of asbestos being chrysotile (over 95%), its crystallographic structure is in the form of a stack of silicates sheets (tridymite structure) and brucite sheets $Mg(OH)_2$.

During the acid attack, the acid reacts with hydroxylic compounds $(OH)^-$ and brucite fibers $Mg(OH)_2$ which results in their disappearance (dissolution of Mg) and therefore the amorphization of asbestos waste which transforms into an inert solid made up of amorphous silica. The magnesium passes into the liquid fraction and will be recovered in the form of a salt or oxide, preferably in the form of magnesium sulfate or magnesium oxide.

Figure 3:
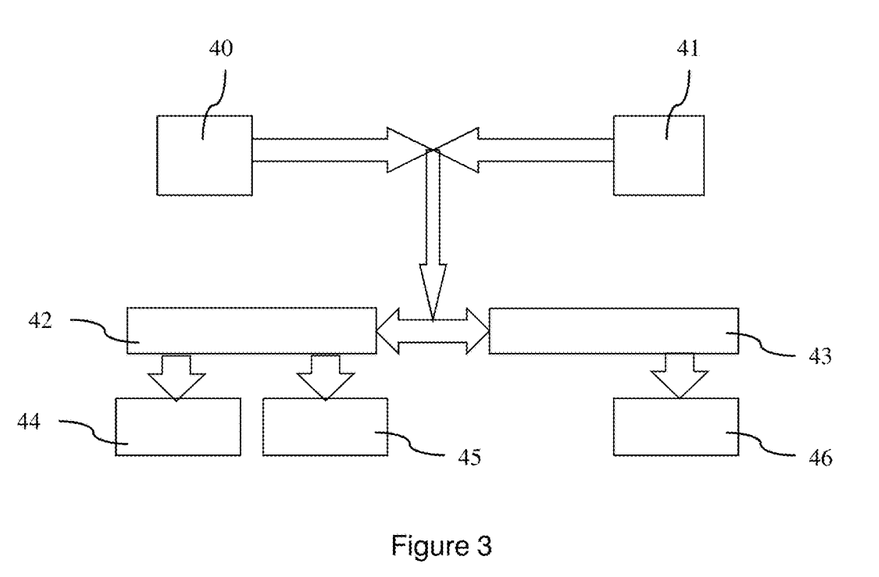
FIG. 3 represents, in the form of a functional diagram, the method is the subject of the present invention.

FIG. 3 shows the method that is the subject of the present invention, which consists of making the acid 40 react with asbestos waste 41 to produce an inert solid phase 42 mostly composed of a silicic and/or calcic solid and a liquid phase comprising mostly magnesium 43, which can be recovered, for example, in the form of a salt or oxide. Depending on the embodiments, the solid silicic and/or calcic phase is used as raw material to be reused by the zeolite synthesis 44 and/or in anhydrites 45. The liquid phase 43 is processed to extract magnesium or a magnesium compound 46.

Figure 4:
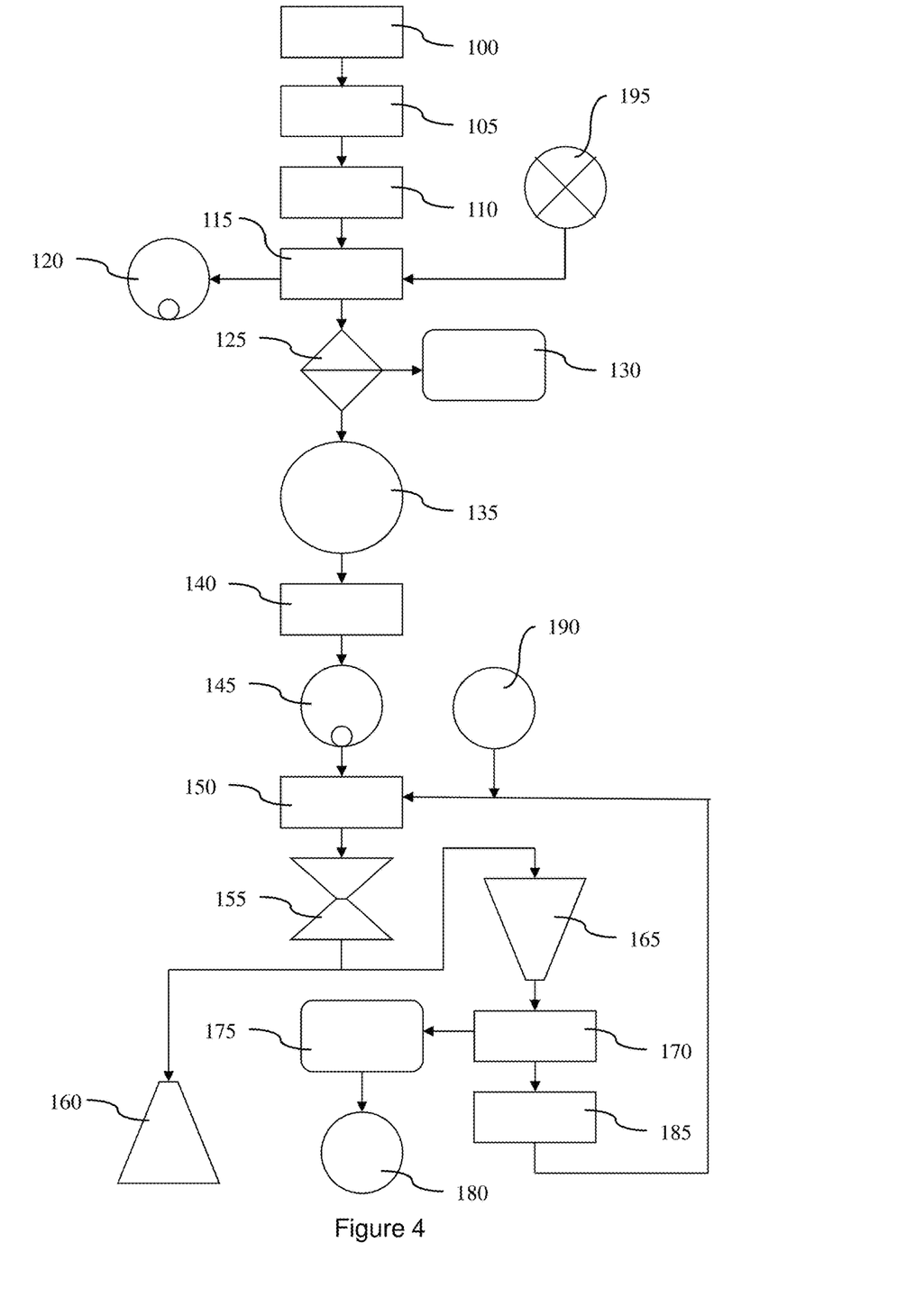
FIG. 4 represents, in the form of an operational diagram, a first embodiment of a fixed asbestos waste neutralization and recycling unit.

As shown in FIG. 4, the method which is the subject of the present invention comprises the following steps:
  dilution of acid and filling 145 of a vat 16 with a diluted acid solution that neutralizes the asbestos waste,
  immersion of waste containing asbestos and neutralization 150 of the asbestos waste in the vat 16,
  filtration 155 to separate the liquid phase and the acid solution after the neutralization of the asbestos waste and of the neutralized waste transformed into inert solids,
  regeneration 185 of the acid solution, which adjusts the hydrogen potential of the extracted liquid phase after filtration by adding acid contained in the acid reservoir, and
  transferring the regenerated solution into the vat.

Preferably, the steps of the method are checked and controlled by the control unit 11. The steps of the method are utilized by means of a device 10 that is the subject of the present invention.

The step of diluting the acid and of filling 145 a vat is carried out by mixing acid contained in the tank 23 with water. The acid is sulfuric acid, for example. The water may come from a water tank, from recycling water used for washing neutralized solid waste and/or from water desalination.

The immersion step and the neutralization step 150 are utilized in the vat 16 of the device 10.

The filtration step 155 is carried out by means of a filter with a pore size between 0.4 and 0.5 µm, preferably 0.45 µm. This filter has a membrane (sieve) resistant to corrosion by the acid used, for example a polypropylene (PP) or polytetrafluoroethylene (PTFE, aka Teflon, registered trademark) membrane. The solids obtained after neutralization of the waste, once recovered during the filtration step 155, are washed and dried. During a step of washing and drying (not shown), water is projected onto the neutralized waste transformed into inert solids to remove the remaining traces of acid. Then, these inert silicic and/or calcic solids are dried in order to be reused.

During the regeneration step 185, the filtered acid solution has acid and/or water added to it to bring the hydrogen potential to the initial predefined value. The water may come from a water tank, from recycling water used for washing neutralized solid waste and/or from water desalination.

Preferably, the method that is the subject of the present invention comprises a step of measuring the attenuation of the acid solution. The acid solution is regenerated as long as the measured attenuation is below a predefined limit value and, when the sensed attenuation is above the predefined limit value, a step 170 of precipitating the magnesium ions from the filtered liquid phase is utilized.

As shown in FIG. 4, the method which is the subject of the present invention may also comprise:
  a step 100 for the installation on or in proximity to the asbestos removal worksite, of a mobile neutralization unit (as described in FIGS. 5 to 9 for example),
  a step 105 of arrival of waste containing asbestos,
  a step 110 of weighing the waste,
  a step 115 of opening and emptying of the waste bags and of spraying with water from a tank 195 to reduce the risk of asbestos fibers escaping into the environment,
  a step 120 of treating and storing the non-reusable waste to be neutralized, such as packaging, wood and personal protection equipment (operators' overall and clothing contaminated with asbestos) extracted during the sorting step 115,
  a step 125 of sorting by a detector of ferrous and non-ferrous metals,
  a step 130 for the stocking of sterile waste or waste comprising metal,
  a step 135 of storing the sorted asbestos waste to be neutralized,
  a step 140 of grinding the asbestos waste to be neutralized,
  a step 160 of extracting the solid (silicic or calcic) fraction from the used acid solution, with possible reuse in the form of zeolites or anhydrite,
  a step 165 of extracting the liquid fraction from the vat containing the used acid,
  a step 170 of precipitating magnesium compounds and, possibly, acid neutralization,
  a step 175 of concentrating the magnesium compounds, and
  a step 180 of storing the magnesium compounds.

Note that the recycling of the solid phase is not described in FIG. 4.

For the mobile asbestos waste neutralization device, the mobility domain may be land-based or shipborne. According to a first domain of terrestrial mobility, the mobile unit may exist in two versions: a "truck" version and a "container" version. The mobile unit, in its shipborne mobility domain, is in the form of a factory ship (a ship outfitted as a plant for treating asbestos waste), able to transport, among others, the land-based mobile units. To achieve this, the mobile neutralization unit associated with the present invention, irrespective of its version and mobility domain, comprises:
  an asbestos waste sorting module,
  an asbestos waste crushing/grinding/shredding module, and a hot acid bath for rendering the asbestos inert, a reactor in the form of a vat of heated acid that enables the asbestos waste neutralization reaction to proceed.

This technology's mobility also makes it possible to bring a local solution to asbestos waste problems, which therefore consists of neutralizing them at source, of cutting costs, as no transport or storing of the asbestos waste in special TSDF-type facilities is required. After this invention has been utilized, only the stabilized asbestos waste is transported. The utilization of this invention will make the operations of transport and storage in TSDF facilities—which are subject to stringent and complex regulations making such services very costly—obsolete.

The whole consists of a neutralization unit and, in some embodiments:

- a container, preferably about twelve meters long, which complies with the regulations in force on ordinary convoys, which supports the neutralization unit during both its transport and its operation, which can be coupled with a container of the same size or smaller that complies with the regulations in force and is able to contain, in particular, the various modules of the treatment unit, ie
- a truck pulling a trailer that provides the same functions,
- a factory ship (a ship outfitted as a plant for the treatment of asbestos waste), able to transport, among others, terrestrial mobile neutralization units, or
- a fixed base on the worksite.

Except for "factory ship" mobile units, the mobile neutralization unit advantageously in a standard 40-foot container. This would allow the loading of the mobile neutralization unit onto a trailer, onto a train, a ship, or even onto a plane.

Figure 5:
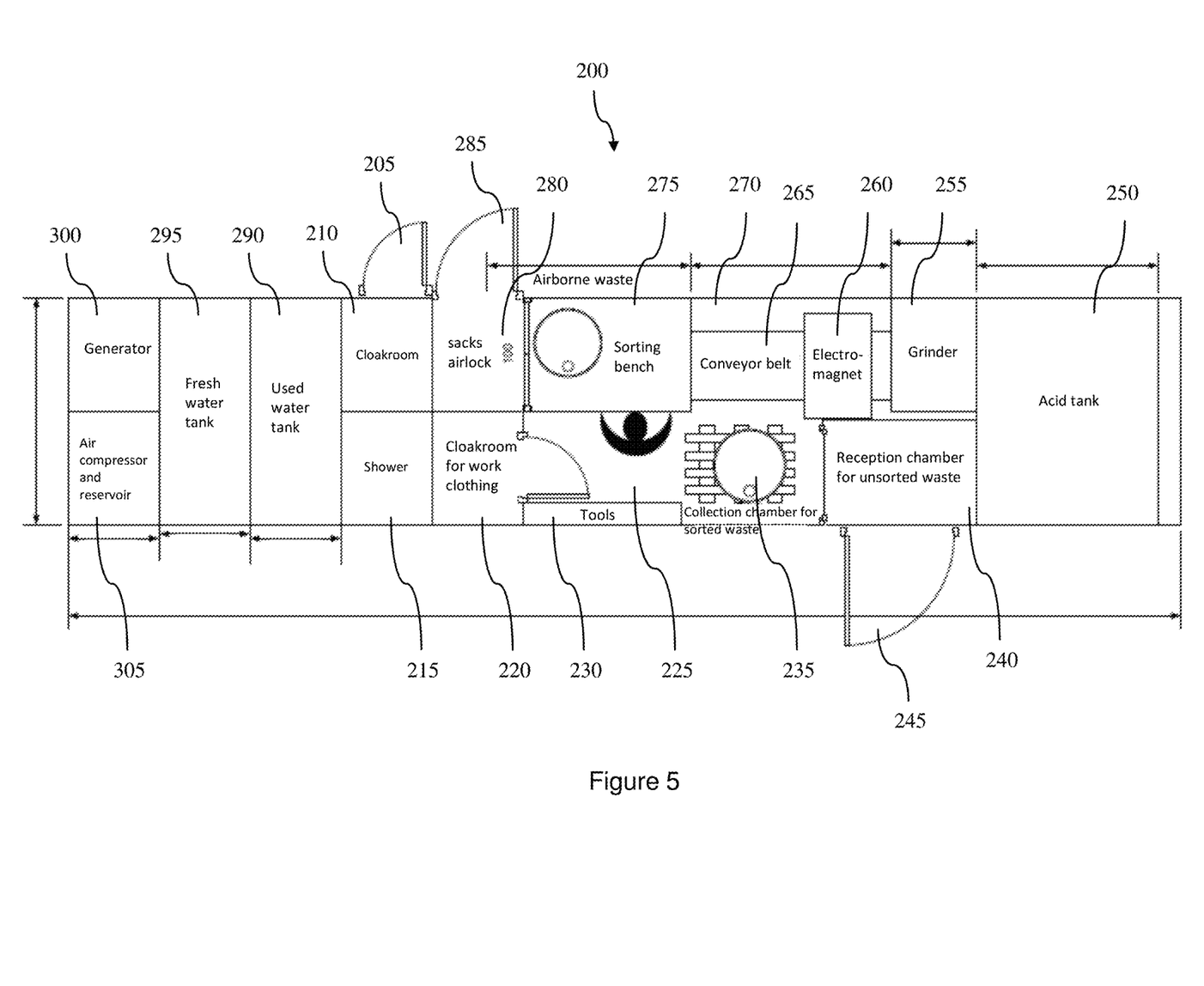
FIG. 5 shows a top view of a first embodiment of a mobile neutralization and recycling unit corresponding to the truck bed mode of fitting.

In some embodiments, the mobile neutralization unit 200 illustrated in FIG. 5 comprises:

- an operator entry door 205 leading to a cloakroom 210,
- a shower 215,
- a cloakroom for working attire 220,
- a module or workshop for sorting 225,
- a detachable vat 250 of acid solution,
- a chamber for inserting bags of waste containing asbestos waste 280 fitted with an exterior door 285,
- a vat for used water 290,
- a vat for fresh water 295,
- a electricity generator 300 and
- an air compressor 305 equipped with a compressed air reservoir.

The cloakroom 210, the shower 215 and the cloakroom 220 constitute jointly an operator decontamination chamber.

The waste sorting module 225 comprises:

- a workbench 275,
- a belt conveyor 265,
- a metal detection unit 260,
- a grinding unit 255,
- a tool cupboard 230,
- a receptacle for non-reusable sorted waste 235 containing asbestos or not and
- an evacuation chamber 240 from the receptacle 235 fitted with an exterior door 245.

The module 225, or workshop, for sorting is equipped with a circuit 270 for air circulation keeping the module 225 at negative pressure, to avoid the airborne diffusion of asbestos fibers outside of the mobile neutralization unit.

In this way, the mobile neutralization unit 200 is confined.

All the asbestos-based waste is humidified (addition of fresh water—not shown) in order to limit the diffusion of dust in suspension and also to fluidify the circulation of the waste.

After grinding, the asbestos waste is transferred through a sealed circuit (eg a sealed suction pump, not shown) to the insulated vat 250 of hot diluted acid. This vat 250 is removable, allowing it to be replaced as and when required. The same applies to the vats for fresh 295 and waste 290 water.

The mobile neutralization unit 200 is also equipped with a technical bay (not represented) making it possible not only to operate all the components in conditions of safety compliant with the regulations in force but also to monitor/verify/operate/register the whole of these parameters in order to be able to ensure the traceability of the admitted waste and to respond at any time to a sanitary inspection.

In addition to the mobile units, the neutralization system could comprise at least one fixed unit or asbestos waste neutralization plant (not shown), which completes the finalization of the neutralization operation previously started in the mobile unit and enabling the supply of vats of preheated acid. The transfer of the acid vats from a mobile neutralization unit to the fixed unit is achieved by a series of simple actions:

- dismounting the vat containing the waste,
- loading of a 'new' vat (preheated acid),
- emptying the waste water vat or swapping it for an empty vat,
- filling the vat with fresh or swapping thereof, and
- connecting to the control system of the mobile neutralization unit for storing the operating data of the mobile neutralization unit in a secured and fixed database at the plant.

The fixed neutralization unit that supplies the mobile neutralization unit comprises:

- a means for dismounting a vat from the mobile neutralization unit which contains the used acid solution,
- a means for loading a vat of pre-heated acid into the mobile neutralization unit,
- a means for emptying a vat of used water or for swapping a vat of used water for an empty vat,
- a means for filling a fresh water vat or for swapping in a fresh water vat, and
- a means for transferring the operating data of the mobile neutralization unit from the mobile neutralization unit to a secure database of the fixed unit.

Preferably, the fixed unit comprises a means for extracting magnesium from the liquid fraction output from the used acid bath.

Preferably, the fixed unit also comprises a means for manufacturing zeolites and/or anhydrite from solid silicic and/or calcic fraction coming from the used acid solution.

In some embodiments, the fixed unit comprises a microwave heater for the acid solution, the vat being lagged to conserve the heat.

In other embodiments, the neutralization units remain deployed on the worksite for the duration of the asbestos removal work and are simply restocked with "new" vats of fresh water and acid, and the used vats are recovered and transported to the treatment plant on "standard" trucks.

The vehicle (not shown) to supply a mobile neutralization unit comprises:

- a means for dismounting a vat from the mobile neutralization unit which contains the used acid solution,
- a means for loading a vat of pre-heated acid into the mobile neutralization unit, a means for emptying a vat of used water or for swapping a vat of used water for an empty vat, a means for filling a vat with fresh water or for swapping in a vat of fresh water.

The mobile neutralization unit and the supply vehicle resemble from the outside known refrigerated trailer trucks (curtains closed), trucks or cargo ships, operating in accordance with international land and sea transport standards.

Figure 6:
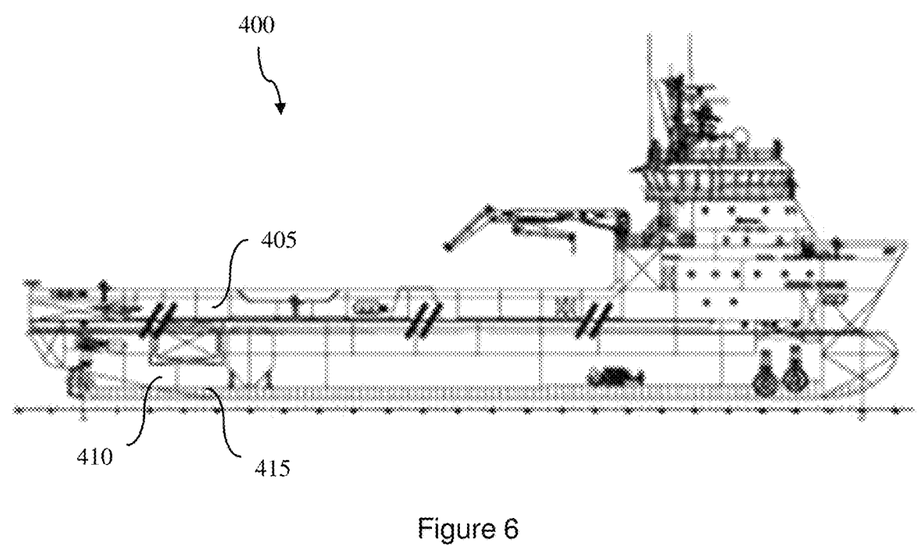
FIG. 6 shows a side view of a second embodiment of a shipborne asbestos waste neutralization and recycling unit that is the subject of the present invention.

FIG. 6 shows a "factory ship" consisting of a transport ship 400 (ideally of "supply boat" type) transporting at least one neutralization unit 405. This ship 400 comprises a motor 415 and a generator 410 driven by the motor 415 and a usable sea water desalinator (not shown here). The electrical supply for each neutralization unit 405 is provided by the generator 410.

Note that the ship 400 can carry simultaneously at least one neutralization unit 405, and replacement vats for the acid, the fresh water tank and waste water tank.

In some operational modes of this system, the ship may transport materials too large for road transport (eg large-size pieces of cut metal).

Figure 7:
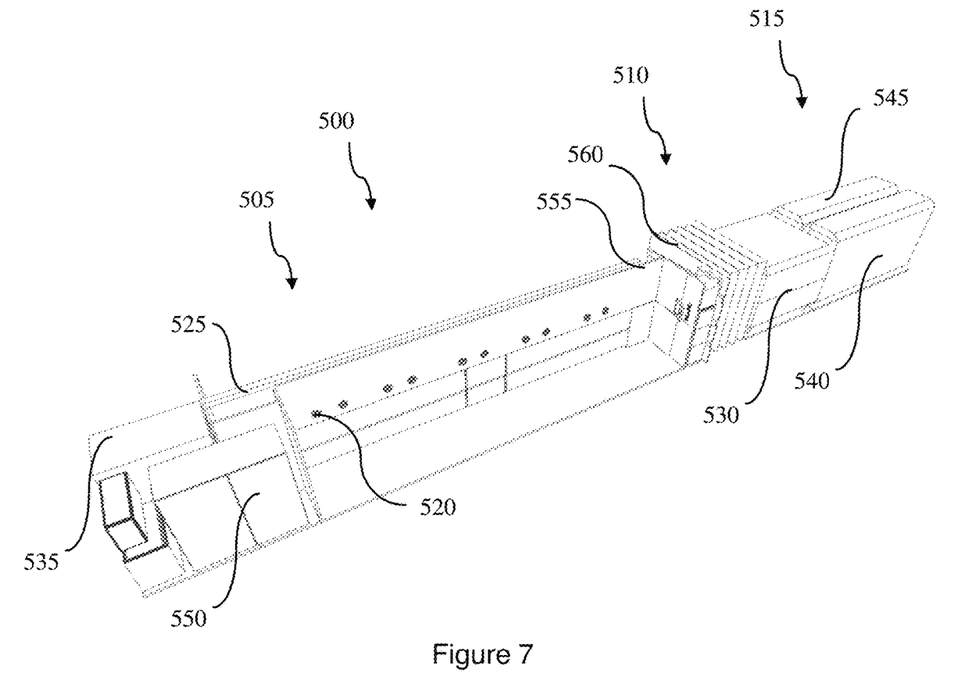
FIG. 7 is a perspective view of a third embodiment of a land-based mobile asbestos waste neutralization and recycling unit.
Figure 8:
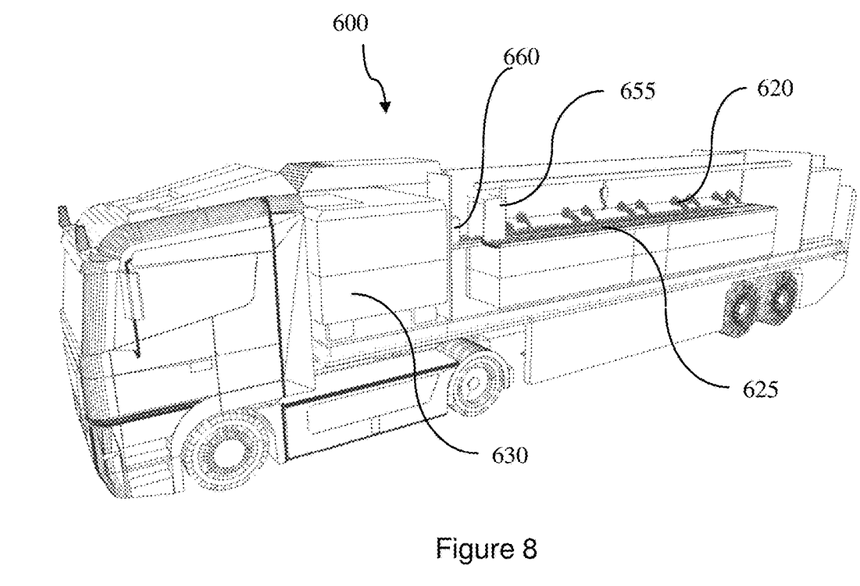
FIG. 8 is a first perspective view of a truck, a fourth embodiment of a mobile asbestos waste neutralization and recycling unit.
Figure 9:
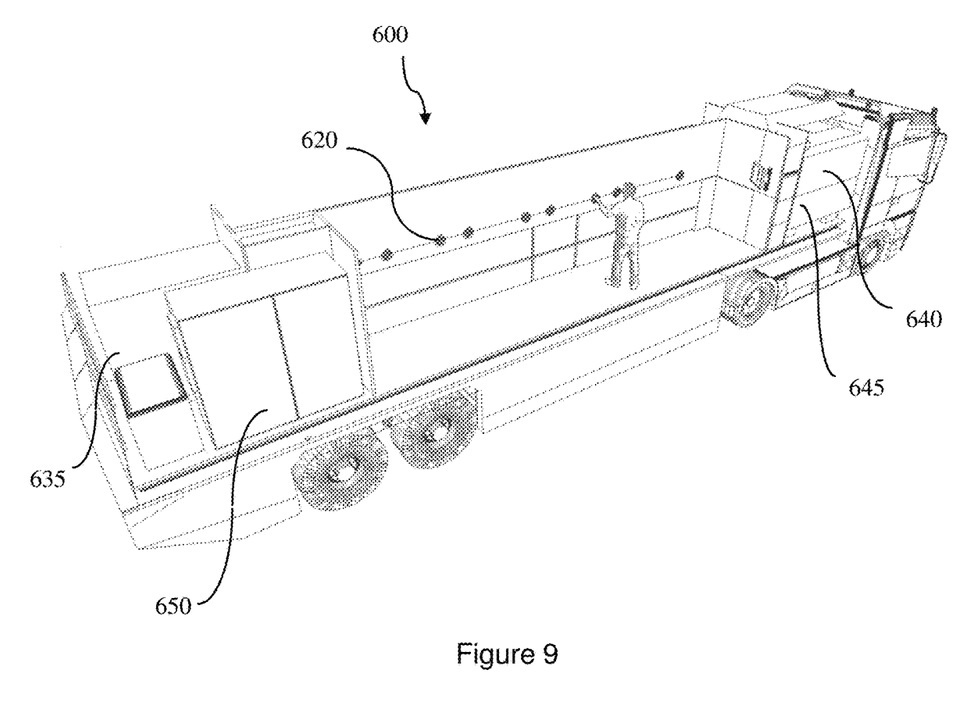
FIG. 9 is a second perspective view of the truck illustrated in FIG. 8.

In the embodiments illustrated in FIGS. 7 to 9, the operators work, in front of a window, wearing standard work clothes, with no requirement for special protective "anti-asbestos" clothing.

In FIG. 7, a mobile asbestos waste neutralization unit 500 comprises:
a sorting module 505, for example able to be housed in a standard 40-foot container,
an articulation 510, for example using bellows, and
a treatment reactor 515, for example sized to fit in a standard 20-foot container.

Glove box positions 520 separated by a window from a conveyor 525 considerably simplify the operations, since the operators do not have to pass through a sterile zone (dress, shower, undress, etc).

The mobile neutralization unit 500 comprises:
a sorting module or workshop with a conveyor 525,
a detachable vat 530 of acid solution,
a chamber for inserting bags of waste containing asbestos waste 535 fitted with an exterior door (not shown),
a vat for used water 540,
a vat for fresh water 545,
an air compressor 550 equipped with a compressed air reservoir,
a metal detection unit 555,
a grinding unit 560,
a receptacle for sorted waste containing no asbestos (not shown), and
an evacuation chamber for waste containing no asbestos (not shown), equipped with an outer door.

Reminder: a glove box is a sealed chamber permitting manipulations in a particular environment. Gloves, for hands and wrists only, or going up to the elbows or shoulders, fixed to a sealed wall, provide access to the interior without breaking the confinement. The operator puts his hands in the gloves and is able to observe his manipulations through the transparent wall.

Consequently, the mobile neutralization unit has no sorting personnel inside the confined zone. The sorting personnel is therefore not subject to the legal constraints concerning work in a dangerous environment, and the decontamination chamber can be reduced or even eliminated completely.

In FIGS. 8 and 9, a mobile asbestos neutralization unit 600 comprises glove box positions 620 separated by a window from a conveyor 625, simplifying considerably the operations since the operators do not have to pass through a sterile zone (otherwise requiring dressing, shower, undressing, etc).

The mobile neutralization unit 600 comprises:
a sorting module or workshop with a conveyor 625,
a detachable vat 630 of acid solution,
a chamber 635 for inserting bags of waste containing asbestos, fitted with an exterior door (not shown),
a vat for used water 640,
a vat for fresh water 645,
an air compressor 650 equipped with a compressed air reservoir,
a metal detection unit 655,
a grinding unit 660,
a receptacle for sorted waste containing no asbestos (not shown), and
an evacuation chamber for waste containing no asbestos (not shown), equipped with an outer door.

There are three advantages to using sulfuric acid instead of any other acid, especially hydrochloric acid:
it is the cheapest acid, it's a commonplace product, its industrial-scale production is high (continuously available from the suppliers),
it is an acid that, by reacting with calcic asbestos waste (of asbestos cement type for example), favors the formation of the anhydrite, which is an essential additive in the manufacture of cements, and
it is an acid whose effect on asbestos fibers is fully acknowledged, since it provides the best neutralization results compared with other mineral or organic acids.

The liquid phase obtained after acid attack comprises the magnesium reusable as a magnesium salt or oxide, which is very useful in many industries, eg in the composition of agricultural fertilizer, in particular.

There follows a description of the recycling possibilities for the inert solid obtained after hot acid attack.

Following the hot acid treatment, the inert solid obtained may be suitable for reuse in different ways, depending on the nature of the initial waste it came from.

This is because the waste containing loose asbestos, such as plaited asbestos cords, has a very high asbestos content and makes it possible, after the hot acid attack, to obtain mainly silica ($SiO_2$) in large quantities thus promoting the fabrication of zeolites.

The waste containing bonded asbestos (10-20% asbestos), such as corrugated fibrocement sheets, has a chemical content of calcium oxide (lime-CaO) and silica ($SiO_2$) of 40% and 19%, respectively. This composition is very close to that of Portland cement (registered trademark). The attack of these materials by hot sulfuric acid makes it possible to obtain mostly calcium sulfate $CaSO_4$ also called Anhydrite. This compound forms in the dominant proportion in mixtures, especially with silica. Anhydrite is an essential additive in the cement manufacturing chain.

It is important to emphasize here the role of sulfuric acid as the determining factor for obtaining Anhydrite, as the use of other acids such as hydrochloric acid does not achieve the same result.

In certain cases, the acid attack on the starting waste leads to the formation of an inert solid comprising mesopores (approximative distribution of the pore diameters: 75% macro and mesopores of diameter superior to 20 Å and 25% micro pores of diameter inferior to 20 Å), and generates an increase in area of its BET specific surface. More generally, the present invention makes it possible to produce products presenting mesopores of which at least 10% have a diameter inferior to 20 Å.

These characteristics (macro structure and mesoporous associated to the harmless fibrous morphology) give remarkable mechanical properties to the inert solid, for example permitting the absorption and/or blocking of a shock wave, eg for energetic materials (explosives manufacturers) and acoustic insulation by sound absorption barriers.

Other applications are envisaged for the intermediate inert solid, for example in the domain of water filtration, applications in which the granular distribution would be able to provide good bacterial support.

Figure 10:
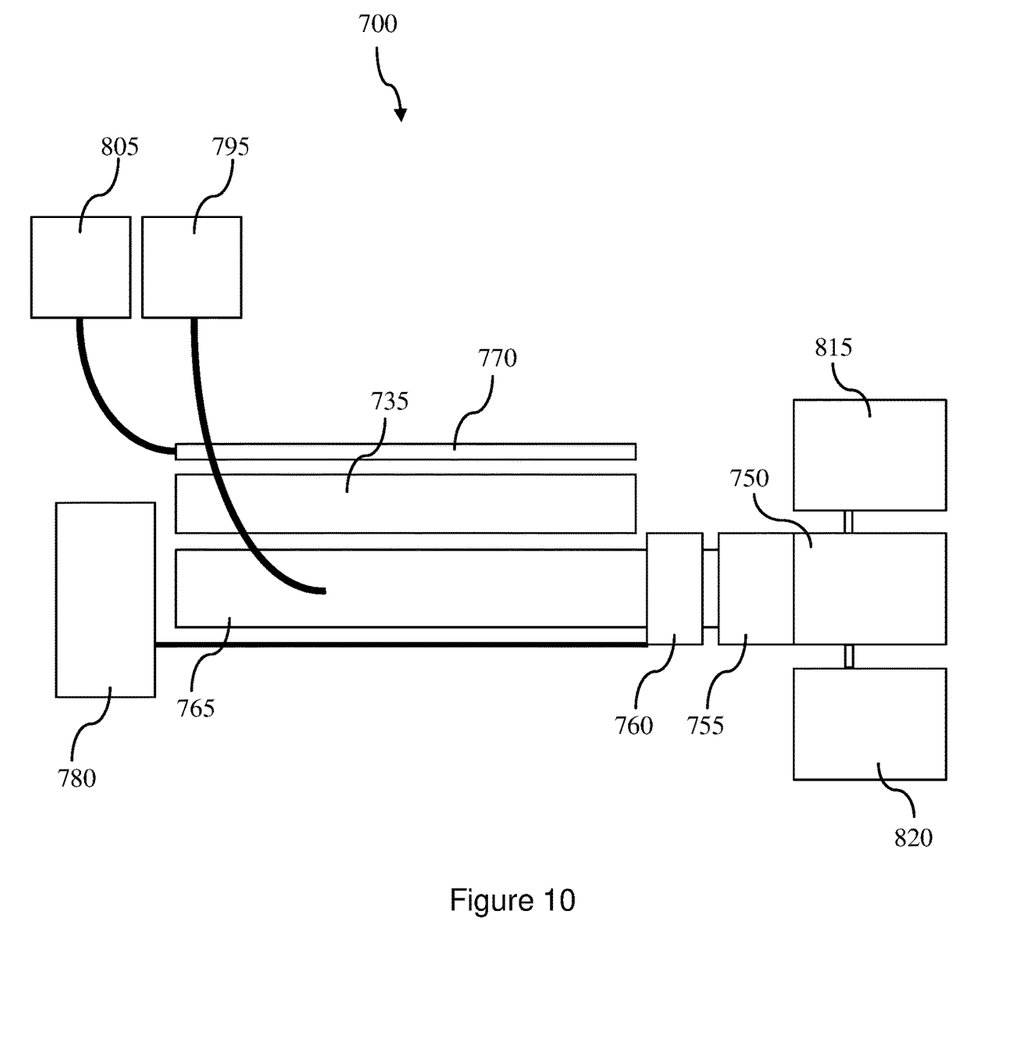
FIG. 10 represents, in a top schematic view, a particular embodiment of a fixed asbestos waste neutralization and recycling unit.

FIG. 10 shows a fixed asbestos waste neutralization unit 700. This fixed unit 700 comprises:
- an acid solution vat 750,
- a chamber for inserting bags of waste containing asbestos 780,
- a vat for fresh water 795, and
- an air compressor 805 equipped with a compressed air reservoir.

A sorting module for the waste comprises:
- a belt conveyor 765,
- a metal detection unit 760,
- a grinding unit 755,
- a receptacle for non-reusable sorted waste 735 containing asbestos or not.

The module for sorting is equipped with a circuit 770 for air circulation keeping the sorting module at negative pressure, to avoid the airborne diffusion of asbestos fibers outside the mobile neutralization unit. The mobile neutralization unit 700 is thereby confined.

All the asbestos waste is humidified by adding fresh water from the fresh water vat 795 in order to limit the diffusion of dust in suspension and also to fluidify the circulation of the waste.

After grinding, the asbestos waste is transferred through a sealed circuit (eg a sealed suction pump, not shown) to the insulated vat 750 of hot diluted acid to be destroyed. This vat is removable, allowing it to be replaced as and when required. The same applies to the vats for fresh and waste water.

The mobile neutralization unit 700 is also equipped with a technical bay (not represented) making it possible not only to operate the whole of the components in conditions of safety compliant with the regulations in force but also to monitor/verify/operate/register all these operating parameter values in order to be able to respond at any time to a sanitary inspection.

In the embodiment shown in FIG. 10, the vat 750 is connected to two filtration and regeneration units, 815 and 820. After a cycle N of neutralization with acid in the vat 750 of a batch of waste containing asbestos, the reactive mixture comprising the solid and the liquid is transferred to one of the two filtration and regeneration units, for example unit 815. Once the vat 750 is empty, a solution of fresh or regenerated acid coming from the filtration and regeneration unit 820 is introduced into the vat 750 to prepare for starting a new neutralization cycle N+1. The asbestos waste coming from the grinding station is then transferred into the vat 750 containing the fresh acid solution, which is waiting, and a new neutralization cycle N+1 begins. While the neutralization cycle N+1 is running, the filtration and regeneration unit 815 performs the filtration of the acid solution coming from the previous neutralization cycle (cycle N), which it has received, and the regeneration of this acid solution for a new neutralization cycle N+2. The roles of the two filtration and regeneration units are then inverted.

In some variants, several vats 750 are used and swapped after the end of each step of neutralization of the asbestos waste by the diluted acid solution.

Continuity of production is thereby achieved.

The invention claimed is:

1. An asbestos waste neutralization device, that comprises:
- an acid tank,
- a vat containing a diluted acid solution, in which waste containing asbestos is dipped, the diluted acid solution neutralizing the waste containing asbestos during a neutralization reaction,
- a filtration unit to separate, at the end of the neutralization reaction, solid inert waste from a liquid phase of the acid solution,
- a regeneration unit for regenerating the liquid phase of the acid solution, which adjusts the hydrogen potential of the liquid phase of the acid solution by adding concentrated acid contained in the acid tank,
- an attenuation sensor for detecting a degree of attenuation of the diluted acid solution,
- a selective precipitation unit for selectively precipitating by-products from the liquid phase of the acid solution, depending on the degree of attenuation the attenuation sensor senses, and
- means for transferring a regenerated acid solution from the regeneration unit into the vat.

2. The device according to claim 1, that comprises means for determining a type and/or content of asbestos in the waste prior to immersion in the vat, with the regeneration unit adjusting the hydrogen potential of the regenerated acid solution as a function of the type and/or content of asbestos.

3. The device according to claim 2, wherein the means for determining a type and/or content of asbestos in the waste determines a content of asbestos in the waste, and wherein the device further comprising means for treating the solid inert waste depending on the determined asbestos content.

4. The device according to claim 1, that comprises an asbestos grinding station positioned upstream from the vat, which reduces the size of the waste to dimension ranging from one-tenth of a millimeter to one millimeter.

5. The device according to claim 1, wherein the attenuation sensor is a probe in the form of an ion-selective electrode.

6. The device according to claim 1, wherein the filtration unit comprises a filter with a pore size of less than 0.5 µm.

7. The device according to claim 1, that comprises an exterior closed loop connected to the vat and having means for cooling vapors exiting from the vat.

8. The device according to claim 1, that comprises means for humidifying waste containing asbestos positioned upstream from the vat of diluted acid solution.

9. The device according to claim 1, that comprises means for desalinating water before the dilution of the acid received from the acid tank in the regeneration unit.

10. The device according to claim 1, that comprises a washing and drying unit for the solid inert waste.

11. The device according to claim 10, that comprises means for recovering washing water for the preparation of the acid solution.

12. The device according to claim 1, wherein the vat comprises at least one agitation system.

13. The device according to claim 1, that comprises means for heating the diluted acid solution with microwaves.

14. The device according to claim 1, that comprises a confined waste containing asbestos sorting unit comprising:
- a window equipped with glove boxes, and
- a conveyor to transport the asbestos waste behind the window.

15. The device according to claim 1, wherein the liquid phase of the acid solution is regenerated as long as the measured attenuation is below a predefined limit value and, when the measured attenuation is above the predefined limit value, the by-products are selectively precipitated from the liquid phase of the acid solution in the selective precipitation unit.

16. A method for neutralizing asbestos waste, that comprises the following steps:
- providing an acid tank with acid,
- providing a vat with a diluted acid solution that is configured to neutralize asbestos waste,
- immersing asbestos waste in the diluted acid solution inside the vat such that the asbestos waste is neutralized,
- separating solid inert waste from a liquid phase of the acid solution in a filtration unit after the asbestos waste has been neutralized,
- regenerating the liquid phase of the acid solution in a regeneration unit, which adjusts the hydrogen potential of the liquid phase of the acid solution by adding acid contained in the acid tank,
- detecting a degree of attenuation of the diluted acid solution using an attenuation sensor,
- selectively precipitating by-products from the liquid phase of the acid solution in a selective precipitation unit depending on the degree of attenuation the attenuation sensor senses, and
- transferring a regenerated acid solution from the regeneration unit into the vat.

17. The method according to claim 16, wherein the liquid phase of the acid solution is regenerated as long as the measured attenuation is below a predefined limit value and, when the measured attenuation is above the predefined limit value, the by-products are selectively precipitated from the liquid phase of the acid solution in the selective precipitation unit.

* * * * *